July 5, 1932.    C. J. STROSACKER ET AL    1,866,329
METHOD OF PREPARING ACETATES
Filed May 25, 1931
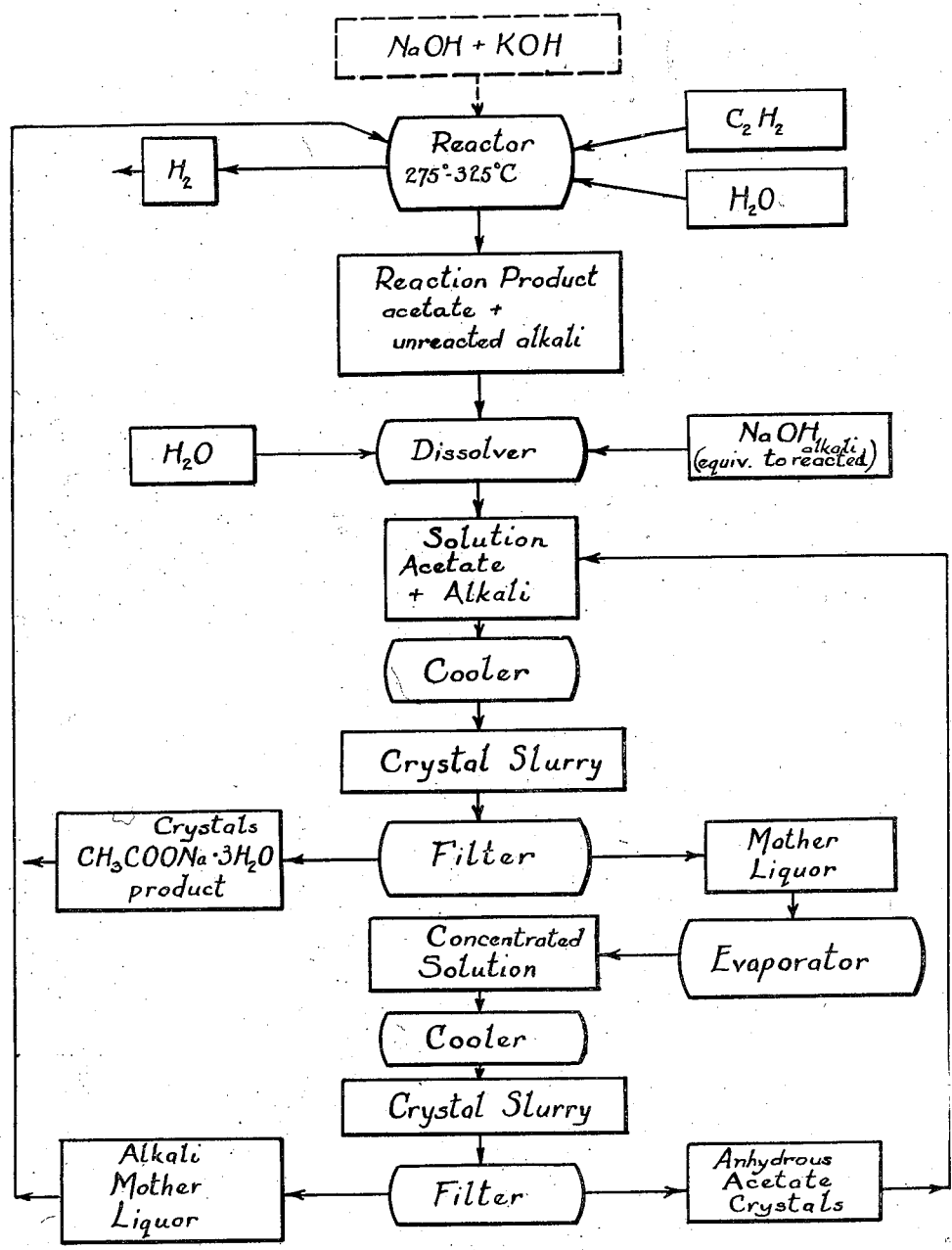
INVENTORS
Chas. J. Strosacker,
BY Chester C. Kennedy and
Earl L. Pelton.
Thomas Griswold, Jr.
ATTORNEY Patented July 5, 1932

1,866,329

UNITED STATES PATENT OFFICE

CHARLES J. STROSACKER, CHESTER C. KENNEDY, AND EARL L. PELTON, OF MIDLAND, MICHIGAN, ASSIGNORS TO THE DOW CHEMICAL COMPANY, OF MIDLAND, MICHIGAN, A CORPORATION OF MICHIGAN

METHOD OF PREPARING ACETATES

Application filed May 25, 1931. Serial No. 539,780.

The invention relates to methods of making alkali metal acetates by reacting an alkali metal hydroxide with acetylene and water.

In a prior application of C. J. Strosacker et al., Serial No. 323,199, filed December 1, 1928, the general reaction here involved has been disclosed, whereby an alkali metal hydroxide is reacted with acetylene and water simultaneously. In another application of C. J. Strosacker et al., Serial No. 411,976, filed December 5, 1929, an improved procedure is described which permits of a substantially continuous production of sodium acetate. In the methods specifically described in each of the foregoing applications the reaction conditions are so controlled that the reaction mixture of alkali metal hydroxide and acetate is maintained in a more or less solid, comminuted form, which has been found best adapted for working with sodium hydroxide.

There are certain limitations, however, to the use of sodium hydroxide alone as the alkali metal hydroxide in the general process referred to, which constitute practical disadvantages from the viewpoint of a commercial process. In order to maintain a satisfactory rate of reaction a temperature above about 275° C. is necessary, and preferably above 300° C. On the other hand, the reaction temperature may not be allowed to rise materially above 325° C., otherwise decomposition of the acetate product will take place. Evidently this situation requires a close temperature control of the reaction within a relatively narrow range, which is somewhat difficult to accomplish in large scale commercial apparatus. Again, the introduction of water to the reaction must be carefully controlled to avoid liquefaction of sodium hydroxide in the reaction mixture which, when it occurs, cements the mass together in a condition such that a satisfactory contact of gaseous and solid reacting materials cannot be provided. It is impractical, however, to attempt to maintain a fused reaction mixture when employing sodium hydroxide alone, since with accumulation of acetate the melting point of the mixture is raised above the aforementioned temperature limit of 325° C. above which decomposition commences.

It is an object of the present invention to make possible a modified form of procedure for carrying out the general reaction in question in such way that a wider operative temperature range may be provided as well as to allow a wider latitude for varying the proportion of water introduced during the reaction. In other words, the invention is intended to simplify operating procedure and to avoid the necessity for controlling the temperature and proportion of water added within such narrow limits as heretofore. The invention, then, consists of the steps hereinafter fully described and particularly pointed out in the claims, the annexed drawing and following description setting forth but a few of the various ways in which the principle of the invention may be used.

In said annexed drawing:—

The single figure is a flow sheet illustrating one preferred mode of carrying out the invention.

We have found that, when potassium hydroxide or a mixture of sodium and potassium hydroxides is employed as the alkali metal hydroxide in the reaction, the reaction mixture may be readily maintained in a liquid or molten condition at the desired temperature, thus greatly simplifying the procedure for conducting and controlling the reaction. By operating with a fused mixture a very considerable excess of water may be introduced without interfering with the completeness of reaction, and in fact by varying the proportion of water introduced a practical means of temperature control is made available. Another advantage lies in the fact that potassium hydroxide reacts more rapidly at lower temperatures than does sodium hydroxide and the acetate may be heated to a higher temperature, e. g. to 350° C. or higher, without danger of decomposition, thus enabling a much wider temperature range to be used in the process.

We have further found that, when utilizing a mixture of potassium and sodium hydroxides, the process may be so regulated that sodium acetate alone is the product recovered while the potassium hydroxide is continuously recycled. The invention, therefore, provides an improved procedure for making sodium acetate wherein all of the advantages inherent in reacting with potassium hydroxide are realized without requiring theoretically the actual consumption of any potassium hydroxide whatever. In practice, the mechanical losses of potassium hydroxide have been found so small as to be nearly, if not entirely, negligible, and the added expense attributable thereto has been more than offset by other economies resulting from the simplified procedure.

The equation representing the present reaction employing potassium hydroxide is:

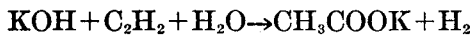

$$KOH + C_2H_2 + H_2O \rightarrow CH_3COOK + H_2$$

The reaction may take place within a temperature range of 150° to 350° C., preferably 250° to 350° C. in order to maintain a practically rapid rate. The potassium acetate product will not be decomposed by heating at a temperature as high as 350° in the presence of an excess of the hydroxide. For the reaction according to the equation equivalent amounts of water and acetylene are required. In order to assist in maintaining the reaction mixture in a fluid condition we may provide a sufficient excess of water to saturate the hydroxide therewith at the temperature employed. For example, at 300° C. a saturated $KOH-H_2O$ mixture contains approximately 24 per cent of water, the mixture is freely fluid and remains so as the acetate product accumulates until a large part of the total alkali is reacted. If the potassium hydroxide-acetate mixture saturated with water should eventually solidify due to the high degree of conversion to acetate, the mass is soft and friable and easily pulverized by an ordinary mechanical stirrer. On the other hand a saturated $NaOH-H_2O$ mixture at 300° C. contains only about 6 per cent water, is not very fluid and with accumulation of a relatively small amount of acetate the mixture solidifies in a form which is difficult to pulverize. For the foregoing reasons, although, as pointed out in the prior applications referred to, it is essential to react in a solid comminuted mixture when sodium hydroxide is the alkali metal hydroxide employed in the reaction and to avoid fusion of the mixture, it is contrariwise most advantageous to react in a fluid mixture when potassium hydroxide is employed. Another advantage of using potassium hydroxide instead of sodium hydroxide in the reaction is that the former may be reacted up to 85 to 90 per cent of the total alkali without appreciable slackening of the reaction rate, whereas with sodium hydroxide alone it is practicable to react only about two-thirds of the total alkali due to the pronounced retardation of the reaction rate after such point is reached.

By employing mixtures of sodium and potassium hydroxides which have lower melting points than the individual hydroxides the reaction mass is also easily maintained in a fluid condition, and similar advantages are realized as in the case of potassium hydroxide alone. A further advantage of working with mixed alkalies, however, we have discovered to exist in the feasibility of separating the acetate product as sodium acetate and recycling the potassium hydroxide. In this way a single, instead of a mixed, acetate product may be prepared, while the alkali consumed is largely sodium hydroxide rather than the more expensive potassium hydroxide. In other words, the advantages of employing the more easily and completely reactable alkali, potassium hydroxide, are retained but the cheaper alkali sodium hydroxide, is actually consumed.

Various modes of procedure may be followed to attain the aforesaid result. For instance, the reaction with the mixed alkalies may be continued only until the amount of acetate formed corresponds to the sodium hydroxide present, the product then being dissolved in water and hydrated sodium acetate, $CH_3COONa.3H_2O$, crystallized and separated from the mother liquor containing the potassium hydroxide, which may be returned to the process. Another procedure is to carry on the reaction until any desired proportion of the total alkali in excess of that represented by the sodium hydroxide present is converted to acetate, then to dissolve the product in water, add sodium hydroxide to the solution equivalent to the difference between the total alkali reacted and the sodium hydroxide used for the reaction, whereby sodium in the solution is made to correspond with the total acetate therein, and finally to crystallize out sodium acetate and separate the same from the mother liquor containing the potassium hydroxide.

Still another procedure, which is well adapted to a continuous process, consists in reacting the optimum percentage of total alkali, e. g. 80 to 90 per cent thereof, dissolving the product in water and adding sodium hydroxide equivalent to all of the alkali reacted. The solution is concentrated, if necessary, and sodium acetate is crystallized therefrom. The mother liquor separated from the acetate crystals contains sodium and potassium hydroxides in about the original amount and proportion, and is returned to the process to supply the alkali required therein. By operating thus in a continuous cycle we have found that as much as one-half of the total acetate may be crystallized out in each cycle as highly pure crystals of composition $CH_3COONa.3H_2O$. The mother liquor separated from the crystals may then be further concentrated and about one-half of the remainder of the acetate crystallized as anhydrous crystals from the strong alkaline liquor. The anhydrous crystals so obtained cannot be washed free from alkali, so that they must be recrystallized in hydrated form to purify them, which can be most economically done by redissolving in the solution of the reaction product, as hereinafter further explained. The final mother liquor containing the balance of the acetate and substantially all of the alkali is recycled in the process to supply alkali for the principal reaction.

The proportions of sodium and potassium hydroxides used for reaction in admixture may be varied considerably, and, in fact, any desired proportions may be employed by suitable modifications of details of procedure. In general, the molecular ratio of $\frac{NaOH}{KOH}$ may be between 1/2 and 2/1, but the invention is not limited thereto.

As already stated, water is preferably introduced to the reaction in amount sufficiently in excess of an equimolecular ratio to the acetylene used to saturate the alkali metal hydroxide at the reaction temperature. Any excess of water over that reacted and required to saturate the alkali will naturally pass off as vapor with the exit gases from the reaction. The addition of water may be useful at times to control the reaction temperature, which tends to rise above the desired upper limit due to the exothermic character of the reaction, the evaporation of surplus water introduced into the reaction being employed to restrain excessive rise in temperature. Water may be introduced either as vapor, liquid or alkali solution. It is advantageous to add at least part of the water as vapor along with the acetylene, for example by passing the latter through a body of water and leading the saturated mixture of gas and vapor into the reaction chamber.

The following examples show results obtained by carrying out the reaction in liquid phase with potassium hydroxide, and with a mixture of sodium hydroxide and potassium hydroxide, respectively, according to the method of the invention.

Example 1

In a covered fusion pot equipped with an agitator a quantity of potassium hydroxide containng 17.7 per cent water was melted at a temperature of approximately 300 C., and a mixture of acetylene with slightly more than an equimolecular amount of water vapor was continuously introduced with constant stirring until the originally fused mixture was transformed to a powdery condition. The product contained potasium acetate corresponding to 83 per cent of the hydroxide employed. The product was clean, substantially colorless and free from tarry impurities.

Example 2

An equimolecular mixture of sodium hydroxide and potassium hydroxide, consisting of 29 parts NaOH and 40 parts KOH by weight with about 13 per cent water, was melted and maintained at a temperature of approximately 300° C. A rapid stream of acetylene gas was passed through a body of water at 83° to 84° C., and the saturated mixture of acetylene and water vapor, containing about 1 volume of the former to 1.2 volume of the latter, was introduced into the molten hydroxide with constant stirring. The reaction was continued until 85.0 per cent of the total hydroxides was converted to acetate. The product was dissolved in water, and 49 parts sodium hydroxide in aqueous solution, equivalent to the total alkali reacted, was added, a total of 186 parts water being added. The hot solution was cooled to 20° C. whereby a portion of the acetate was crystallized out as $CH_3COONa.3H_2O$. The crystals were filtered from the mother liquor and washed with a small amount of water, 51 parts of purified crystals of $$CH_3COONa.3H_2O$$

being obtained, corresponding to 31 parts anhydrous $CH_3COONa$. The mother liqpor was further concentrated to evaporate 103 parts $H_2O$, cooled to 20° C. and a precipitate of anhydrous acetate crystals obtained, containing 32 parts $CH_3COONa$, 12 parts KOH and 18 parts water.

In practice the latter crystals would be separated from the mother liquor and added to a succeeding reaction bath to be recrystallized therewith, while the concentrated mother liquor, containing about 45 parts $CH_3COONa$ and most of the alkali, would be returned to the principal reaction to supply the alkali and a portion of the water therein. In continuous operation, with the proportions of materials just enumerated and with recycling of the second crystals and final mother liquor, about one-half of the total acetate would be recovered at each cycle in the first crop of pure hydrated crystals, about one-quarter of the total would be obtained as anhydrous crystals and returned to the first crystallizing step, and the remaining one-quarter of the acetate would be returned to the initial reaction in the mother liquor.

Referring to the drawing, the flow sheet represents the sequence of steps and movement of materials in a continuous cyclic process employing a mixture of sodium and potassium hydroxides. To start the process, a mixture of sodium and potassium hydroxides in any desired proportion, for example an equimolecular mixture, is melted up in a suitable reactor provided with means for heating the same and for agitating the contents. Then acetylene and water vapor are introduced in approximately the proportion of 1 volume of the former to from 1 to 2 volumes of the latter while actively stirring the fused alkali, such proportion of water being sufficiently in excess of an equimolecular equivalent of the acetylene to saturate the alkali at the reaction temperature which is maintained preferably between 275° and 325° C. When the reaction has been initiated the heat developed will normally be sufficient to maintain the desired temperature without further addition of heat from an external source. The reactor is preferably to be provided with a vent to the air, so that no material pressure is built up therein and the hydrogen formed is continuously vented away. After the reaction is started, further additions of alkali metal hydroxide are made by returning the mother liquor from the crystallization of the acetate product in a subsequent step, as will be described hereinafter, and the introduction of fresh hydroxide directly to the reactor is discontinued after the first charge, as is signified by the dotted lines indicating such initial charge.

The reaction is conveniently carried to the point where from 80 to 90 per cent of the hydroxide in the mixture has been converted to acetate, whereupon the product is discharged and dissolved up in water. To the solution an amount of sodium hydroxide is added corresponding to all of the acetate formed, i. e. equivalent to the total alkali reacted, and the solution, which is hot due to heat of solution developed, is adjusted in concentration to contain approximately 45 to 50 per cent solids. The hot solution is cooled, conveniently to about 20° C., to crystallize hydrated sodium acetate, $CH_3COONa.3H_2O$. The first crop of crystals, which may consist of from 30 to 50 per cent of the total acetate depending upon the proportion of mother liquor used in the principal reaction, is filtered and washed with a small amount of water, being thereby obtained directly in a highly pure state. The mother liquor filtered from the crystals is concentrated by evaporation to remove about 35 to 40 per cent of the water therein, the concentrated solution cooled to produce a second crop of crystals and the latter are filtered. The anhydrous acetate crystals so obtained, which are wet with adhering mother liquor, are not washed but are returned directly to the dissolving step following the principal reaction, the further purification thereof being combined most advantageously with the working up of the reaction product. The mother liquor from the last crystals, containing most of the alkali metal hydroxide and the residual proportion of acetate, is returned to the principal reaction to supply alkali thereto, as already indicated.

By proceeding in the manner described the final product obtained consists of the first crop of highly pure hydrated sodium acetate crystals, whereas the potassium hydroxide is continuously recycled in the mother liquors. When the process is conducted continuously in a cyclic manner, fresh alkali is added to the system in the dissolving step, such addition consisting substantially only of sodium hydroxide, while potassium hydroxide requires to be added merely in amount sufficient to compensate for mechanical losses, which are normally very small. In the principal reaction the addition of alkali is made with the strong mother liquor separated from the crystals from the second crystallization step.

The use of superatmospheric pressure is unnecessary in carrying out the reaction for the formation of acetate, particularly if a rich acetylene gas is employed. However, the reaction may be carried out under pressure if desired, for instance, when using an acetylene gas diluted with other gases inert to the reaction, such as hydrogen, nitrogen, methane, ethylene, etc. The absorption and utilization of acetylene is more or less dependent upon the intimacy of contact that is provided between the gas and the molten alkali reaction mixture, therefore being affected by factors of mechanical design as well as operating control. In practice, however, we have found that a conversion of 95 per cent or more of the acetylene to acetate is readily attainable, when proceeding in the manner hereinbefore described.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an acetate which comprises reacting a body of alkali metal hydroxide containing potassium hydroxide with acetylene and water simultaneously.

2. The method of making an acetate which comprises reacting a liquid alkali metal hydroxide comprising potassium hydroxide with acetylene and water simultaneously at a temperature between 150° and 350° C.

3. The method of making an acetate which comprises melting a body of alkali metal hydroxide containing potassium hydroxide and contacting acetylene and water therewith at a temperature between 150° and 350° C.

4. The method of making an acetate which comprises reacting a mixture of sodium and potassium hydroxides with acetylene and water simultaneously at a temperature between 250° and 350° C.

5. The method of making an acetate which comprises melting a mixture of sodium and potassium hydroxides and contacting the same with acetylene and water at a temperature between 250° and 350° C.

6. The method of makng an acetate which comprises reacting a fused mixture of sodium and potassium hydroxides with acetylene and water at a temperature between 275° and 325° C., water being introduced in excess of an equimolecular proportion to the acetylene employed.

7. The method of making an acetate which comprises reacting a fused mixture of sodium and potassium hydroxides with acetylene and water at a temperature between 275° and 325° C., water being introduced in excess of an equimolecular proportion to the acetylene employed, dissolving the product in water, crystallizing sodium acetate as the hydrated salt $CH_3COONa.3H_2O$, separating the crystals and returning the mother liquor containing potassium hydroxide to the initial reaction.

8. The method of making an acetate which comprises reacting a fused mixture of sodium and potassium hydroxides with acetylene and water at a temperature between 275° and 325° C., water being introduced in excess of an equimolecular proportion to the acetylene employed, dissolving the product in water, adding sodium hydroxide equivalent to the actetate present, crystallizing sodium acetate as the hydrated salt $CH_3COONa.3H_2O$, separating the crystals and returning the mother liquor to the initial reaction.

9. The method of making an acetate which comprises reacting a fused mixture of sodium and potassium hydroxides with acetylene and water in proportion of one volume of acetylene to from 1 to 2 volumes of water at a temperature between 275° and 325° C., continuing the reaction until at least 80 per cent of the total alkali is converted to acetate, dissolving the product in water, adding sufficient sodium hydroxide to make the sodium present at least equivalent to the total acetate, crystallizing sodium acetate as the hydrated salt $CH_3COONa.3H_2O$, separating the crystals and returning the mother liquor to the initial reaction to supply at least a portion of the alkali metal hydroxides therein.

10. The method of making an acetate which comprises reacting a fused mixture of sodium and potassium hydroxides with acetylene and water in proportion of one volume of acetylene to from 1 to 2 volumes of water at a temperature between 275° and 325° C., continuing the reaction until at least 80 per cent of the total alkali is converted to acetate, dissolving the product in water, adding sodium hydroxide in amount equivalent to the total acetate present, crystallizing sodium acetate as the hydrated salt $CH_3COONa.3H_2O$, separating the crystals and returning the mother liquor to the initial reaction to supply alkali metal hydroxides therein.

11. The method of making an acetate which comprises reacting a fused mixture of sodium and potassium hydroxides with acetylene and water in proportion of one volume of acetylene to from 1 to 2 volumes of water at a temperature between 275° and 325° C., continuing the reaction until at least 80 per cent of the total alkali is converted to acetate, dissolving the product in water, adding sodium hydroxide in amount equivalent to the total acetate present, adjusting the concentration of the solution to contain from 45 to 50 per cent total solids, cooling to crystallize sodium acetate as the hydrated salt $CH_3COONa.3H_2O$, separating the crystals, concentrating the mother liquor to crystallize a second crop of crystals, separating the latter and returning the same to said dissolving step, and returning the final mother liquor to the initial reaction to supply alkali metal hydroxides therein.

Signed by us this 22d day of May, 1931.
CHARLES J. STROSACKER.
CHESTER C. KENNEDY.
EARL L. PELTON